United States Patent
Gardner et al.

(10) Patent No.: US 10,359,099 B1
(45) Date of Patent: Jul. 23, 2019

(54) CYCLOIDAL DIFFERENTIAL

(71) Applicant: SCHAEFFLER TECHNOLOGIES AG & CO. KG, Herzogenaurach (DE)

(72) Inventors: Matthew Gardner, Harrisonburg, VA (US); Peter Burke, Charlotte, NC (US); Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/864,460

(22) Filed: Jan. 8, 2018

(51) Int. Cl.
*F16H 1/32* (2006.01)
*F16H 48/06* (2006.01)

(52) U.S. Cl.
CPC ............... *F16H 1/32* (2013.01); *F16H 48/06* (2013.01)

(58) Field of Classification Search
CPC . F16H 1/32; F16H 48/06; F16H 48/14; F16H 48/38; F16H 48/40; F16H 2048/385
See application file for complete search history.

(56) References Cited

U.S. PATENT DOCUMENTS

| | | | |
|---|---|---|---|
| 3,499,348 A | 3/1970 | Hartupee | |
| 3,791,237 A | 2/1974 | Kitano et al. | |
| 5,197,930 A | 3/1993 | Imase | |
| 7,147,582 B2 * | 12/2006 | Mingishi | F16H 1/32 475/163 |
| 7,749,123 B2 | 7/2010 | Miao et al. | |
| 8,221,278 B2 | 7/2012 | Biermann et al. | |
| 10,184,547 B2 * | 1/2019 | Fecko | F16H 1/32 |
| 2006/0089227 A1 | 4/2006 | Fanselow et al. | |
| 2008/0188341 A1 | 8/2008 | Miao et al. | |
| 2011/0082000 A1 | 4/2011 | Makino | |
| 2014/0018203 A1 * | 1/2014 | Huang | F16H 1/32 475/168 |
| 2017/0152931 A1 | 6/2017 | Noguchi et al. | |

FOREIGN PATENT DOCUMENTS

JP 2016031081 A 3/2016

OTHER PUBLICATIONS

Notice of Allowance for U.S. Appl. No. 15/864,442 dated Apr. 3, 2019, 13 pages.
International Search Report and Written Opinion for Application No. PCT/US2018/061967, dated Mar. 12, 2019, 11 pages.

\* cited by examiner

*Primary Examiner* — Mark J Beauchaine
(74) *Attorney, Agent, or Firm* — Brooks Kushman P.C.

(57) ABSTRACT

A cycloidal differential includes a driven body and a coupling ring supported for rotation within the driven body. The coupling ring defines a first eccentric race and a second eccentric race on opposing sides of the coupling ring. The cycloidal differential further includes first and second cycloidal drives. The first cycloidal drive includes a first roller disk received in the first eccentric race and a first output member operably coupled to the first roller disk and configured to couple with a half shaft. The second cycloidal drive includes a second roller disk received in the second eccentric race and a second output member operably coupled to the second roller disk and configured to couple with another half shaft.

20 Claims, 5 Drawing Sheets

US 10,359,099 B1

CYCLOIDAL DIFFERENTIAL

TECHNICAL FIELD

The present disclosure relates to differentials for vehicles and more specifically to cycloidal differentials that include a pair of cycloidal drives arranged to allow independent rotation of the left and right wheels.

BACKGROUND

Cycloidal drives are commonly used as speed-reducer mechanisms. A typical cycloidal drive includes an input shaft having an eccentric end connected to a cycloidal disk (also known as a cycloidal cam). The disk includes a plurality of lobes that intermesh with ring pins circumferentially surrounding the disk. The ring pins are typically stationary with the housing of the speed reducer. An output shaft includes an array of circumferentially arranged roller pins that are received within holes defined in the cycloidal disk. The input shaft drives the disk in an eccentric, cycloidal motion. Motion is transferred from the disk to the output shaft via the plurality of roller pins. The eccentric, cycloidal motion of the disk reduces the speed between the input shaft and the output shaft according to the number of lobes, holes, pins, and rollers. The difference between the number of rollers and the number of lobes is usually one, and the number of lobes usually matches the number of pins.

SUMMARY

According to one embodiment, a cycloidal differential includes a driven body and a coupling ring supported for rotation within the driven body. The coupling ring defines a first eccentric race and a second eccentric race on opposing sides of the coupling ring. The cycloidal differential further includes first and second cycloidal drives. The first cycloidal drive includes a first roller disk received in the first eccentric race and a first output member operably coupled to the first roller disk and configured to couple with a half shaft. The second cycloidal drive includes a second roller disk received in the second eccentric race and a second output member operably coupled to the second roller disk and configured to couple with another half shaft.

According to another embodiment, a cycloidal differential includes a first cycloidal drive and a second cycloidal drive. The first cycloidal drive includes a first roller disk having internal rollers and axially extending pins, and a first cycloidal cam defining lobes configured to engage with the rollers and configured to couple with a half shaft. The second cycloidal drive includes a second roller disk having internal rollers and axially extending pins, and a second carrier disk defining holes that receive the pins of the second roller disk and configured to couple with another half shaft.

According to yet another embodiment, a cycloidal differential includes a driven body, a coupling ring, and first and second cycloidal drives. The coupling ring is supported for rotation within the driven body and has a first eccentric race and a second eccentric race on opposing sides of the coupling ring. The first cycloidal drive includes a first roller disk received in the first eccentric race and defines a central opening having internal rollers circumferentially arranged around a perimeter of the opening. The first roller disk further has pins circumferentially arranged on a face of the first roller disk. A first cycloidal cam, of the first drive, is supported within the central opening and defines lobes configured to engage with the rollers. The first cycloidal cam is configured to couple with a half shaft. A first side plate is attached to a first side of the driven body and defines circumferentially arranged holes that receive the pins therein. The second cycloidal drive includes a second roller disk received in the second eccentric race and defining a central opening having internal rollers circumferentially arranged around a perimeter of the opening. The second roller disk further has pins circumferentially arranged on a face of the second roller disk. A carrier disk is supported for rotation within the coupling ring between the first and second roller disks and defines holes that are circumferentially arranged and that receive the pins of the second roller disk therein. The carrier disk is configured to couple with another half shaft. The second drive further includes a second endplate is attached to a second side of the driven body and a second cycloidal cam rotationally fixed to the second endplate and supported for rotation with the central opening of the second roller disk. The second cycloidal cam defines lobes configured to engage with the rollers of the second roller disk.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include a differential on a driven axle to multiply torque of the powertrain and/or allow independent rotation of the left and right driven wheels during cornering. Differentials include a housing supported under the vehicle and have left and right connections configured to receive left and right half shafts of the driven axle. The half shafts transmit torque from the differential to the driven wheels. Used herein "half shaft" refers to any shaft that transmits power from a differential to a driven wheel.

Many types of differentials are known including bevel-gear differentials and spur-gear differentials. These differentials include a gear train disposed within the differential case in order to transmit power from the driveshaft to the half shafts. These types of differentials tend to be bulky requiring a sizable packaging space. The following figures and related text describe a completely different type of differential that does not include a gear train and instead includes a pair of cycloidal drives coupled in tandem. This type of differential is referred to herein as a "cycloidal differential." Cycloidal differentials are compact and require less packaging space on the vehicle than traditional differentials.

Figure 1:
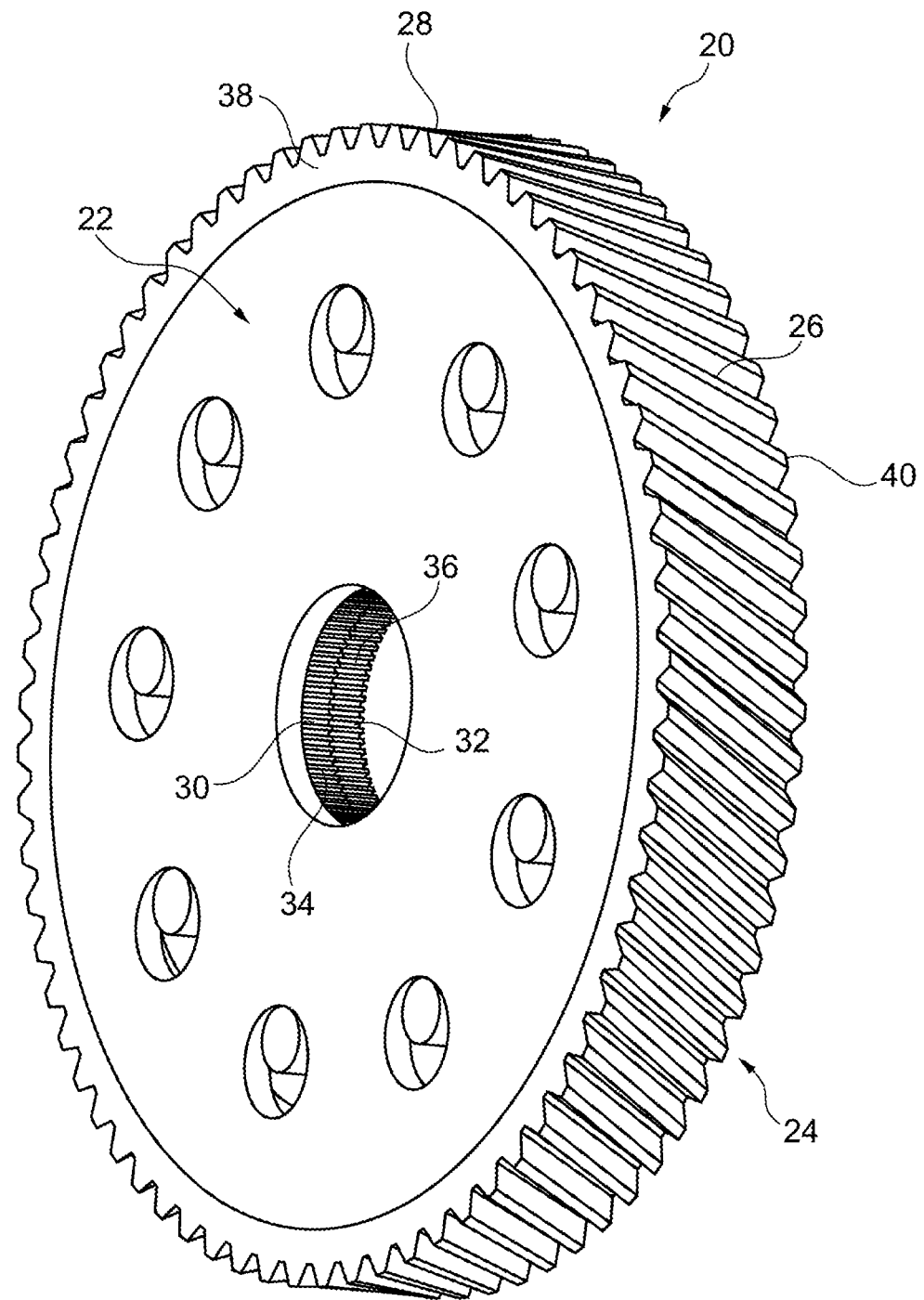
FIG. 1 is a perspective view of a cycloidal differential.

Referring to FIG. 1, a cycloidal differential 20 includes a driven body that is the power-receiving element of the differential. The driven body may be operably coupled to a driveshaft. The driven body may be a gear such as ring gear 26. Alternatively, the driven body may be a bevel gear, a chain-driven sprocket, a belt-driven pully, a carrier, or the like. In the illustrated embodiment, the differential 20 includes a first cycloidal drive 22 and a second cycloidal drive 24 disposed on opposing sides of a ring gear 26. The ring gear 26 includes gear teeth 28 that may mesh with gear teeth of a pinion driven by a driveshaft.

The first cycloidal drive 22 includes an input member configured to receive power from the ring gear 26 and an output member 30 configured to couple with a half shaft. The output member 30 may define a central bore that defines internal splines 34 for receiving external splines of the half shaft. The second cycloidal drive 24 includes an input member configured to receive power from the ring gear 26 and an output member 32 configured to couple with another half shaft. The output member 32 may define a central bore that defines internal splines 36 for receiving external splines of the another half shaft.

The cycloidal drives 22, 24 allow for a very compact differential. The first and second drives 22, 24 may be completely disposed between the first and second faces 38, 40 of the ring gear 26. In a traditional bevel-gear differential, a carrier is attached to the bevel gear and axially extends significantly past a footprint of the bevel gear. This enlarges the differential housing and requires vehicle designers to provide a much larger packaging space for the bevel-gear differential. In contrast, a case (not shown) for the differential 20 need not extend significantly past the ring gear 26. Thus, a much smaller packaging space is required for the differential 20 as compared to traditional differentials.

Figure 2:
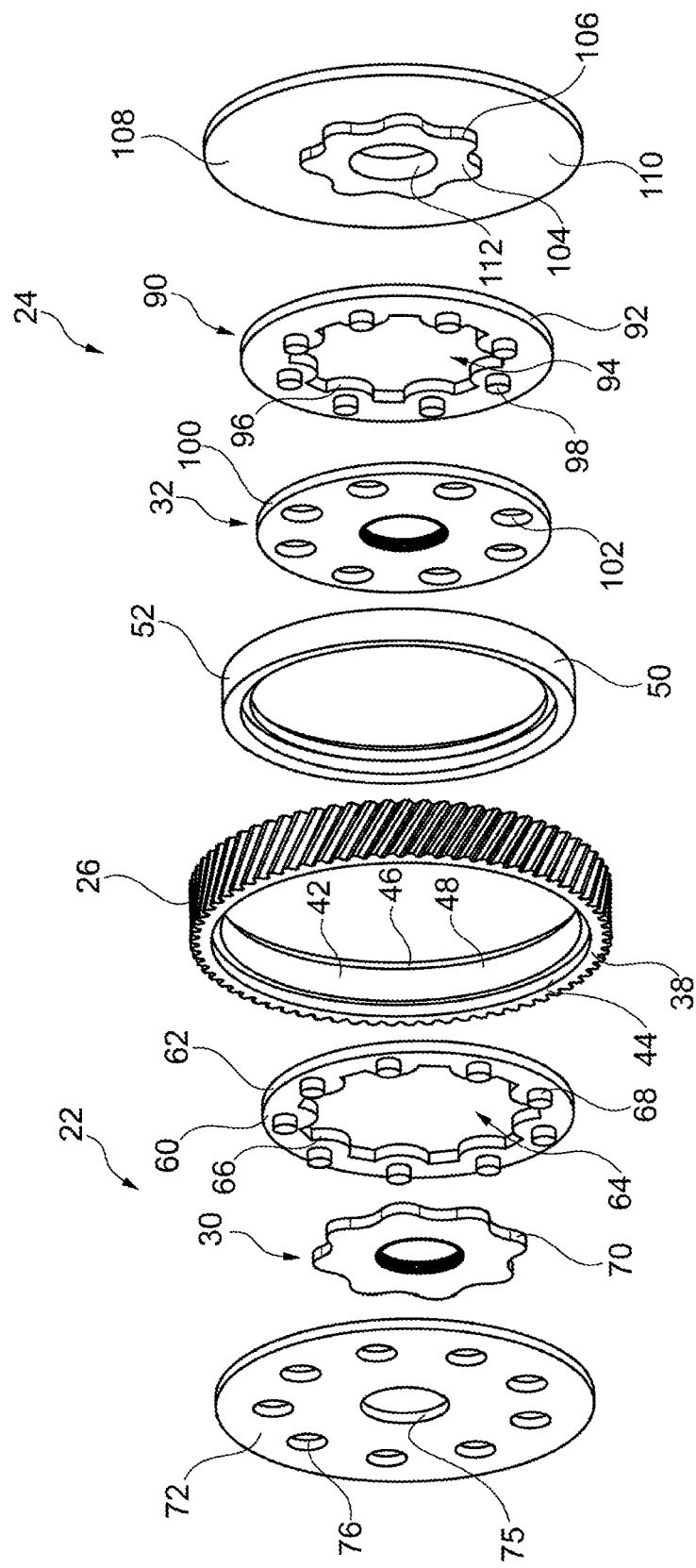
FIG. 2 is an exploded perspective view of the cycloidal differential.
Figure 3:
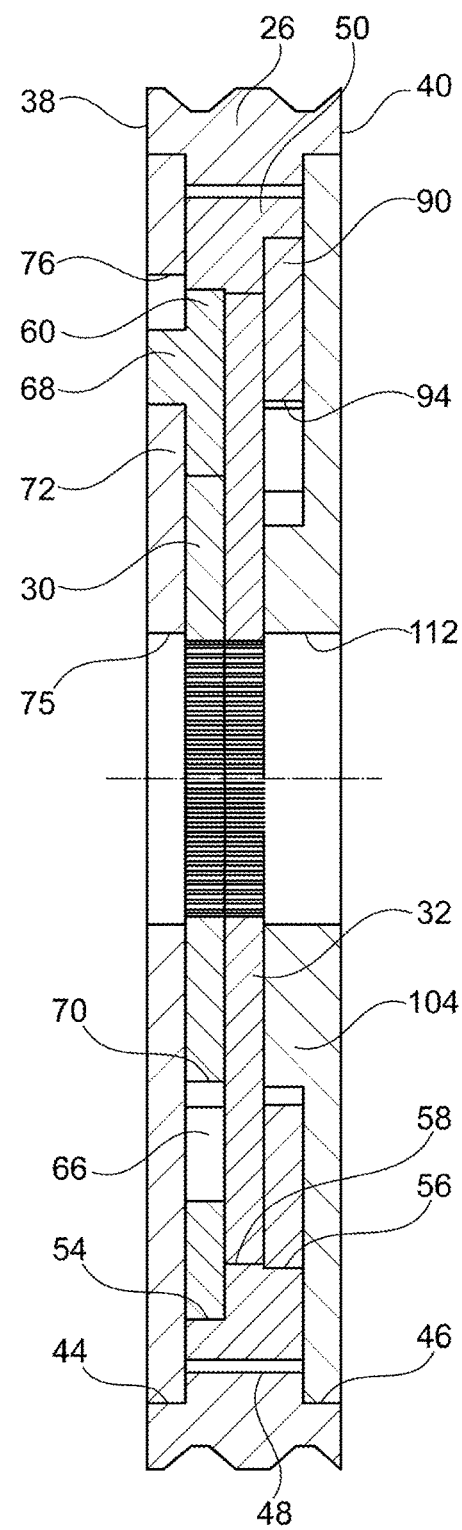
FIG. 3 is a cross-sectional side view of the cycloidal differential.

Referring to FIGS. 2 and 3, the first end face 38 and the second end face 40 are disposed on opposite sides of a hub 42. The hub 42 defines a first recess portion 44, a second recess portion 46, and a central portion 48. A coupling ring 50 is supported for rotation within the hub 42. The couple ring 50 interconnects the first and second drives 22, 24. The coupling ring 50 includes an outer surface 52 that is seated on the central portion 48. A bearing may be provided between the coupling ring 50 and the hub 42 to reduce friction. The inner surface of the coupling ring 50 defines a first eccentric race 54, a second eccentric race 56, and a concentric race 58. The first and second races 54, 56 may have different center points to create a phase difference. The phase difference between the first and second races 54, 56 may be between 170 and 200 degrees, inclusive. In the illustrated embodiment, the phase difference is 180 degrees. A phase difference between the races may not be required in all applications.

The first cycloidal drive 22 includes a roller disk 60 that is received in the first eccentric race 54 with an outer surface 62 of the roller disk disposed against the first eccentric race 54. A bearing may be disposed between the outer surface 62 and the race 54. The roller disk 62 is supported for eccentric, cycloidal motion (also known as wobbling or orbital motion) within the ring gear 26 via the coupling ring 50. The roller disk 60 defines a central opening 64 having a plurality of internal rollers 66 circumferentially arranged around a perimeter of the opening 64. The rollers 66 may be integrally formed with the disk 60 or may be separate components that are attached to the disk 60. In some embodiments, the rollers 66 are static components that are rotationally fixed with the disk 60, and in others, the rollers 66 are configured to rotate relative to the disk 60. A plurality of pins 68 are circumferentially arranged on a face of the disk 60. The pins 68 project from the face in an axial direction of the differential 20. The pins 68 may be integrally formed with the disk 60 or may be separate components that are attached to the disk 60. In some embodiments, the pins 68 are static components that are rotationally fixed with the disk 60, and in others, the pins 68 are configured to rotate relative to the disk 60. The number of pins 68 and the number of rollers 66 may be equal. The pins 68 may be attached to the roller disk 60 so that associated ones of the pins 68 and the rollers 66 have a common center point.

The output member 30 is supported for rotation within the central opening 64 of the roller disk 62. In the illustrated embodiment, the output member 30 is a cycloidal cam. The cycloidal cam 30 includes a plurality of lobes 70 configured to engage with the internal rollers 66. The number of lobes 70 may be less than the number of rollers 66. In the illustrated embodiment, the cam 30 includes eight lobes and the roller disk 60 includes nine rollers and nine pins.

The first cycloidal drive 22 also includes a side plate 72 that is rotationally fixed to the ring gear 26. The side plate 72 may be attached to the first end face 38 of the hub 42 by welding, fasteners, or the like. The side plate 72 defines a central opening 75 providing clearance for the half shaft to connect with the cam 30 and defines a plurality of holes 76 circumferentially arranged to receive the pins 68. A diameter of the holes 76 is larger than a diameter of the pins 68 allowing for the eccentric, cycloidal motion of the roller disk 60. Eccentric bearings may be provided between the pins 68 and the holes 76.

The first cycloidal drive 22 is configured to have relative rotation between its various components. For example, if the side plate 72 is held stationary and the cam 30 is rotated clockwise, then the roller disk 60 will have a counterclockwise eccentric, cycloidal motion. Since the roller disk 60 is connected with the coupling ring 50, the coupling ring will rotate counterclockwise within the ring gear 26 when the cam 30 is rotated clockwise.

The second cycloidal drive 24 includes a roller disk 90 that is received in the second eccentric race 56 with an outer surface 92 of the roller disk 90 disposed against the second eccentric race 56. A bearing may be disposed between the outer surface 92 and the race 56. The roller disk 90 is supported for eccentric, cycloidal motion within the ring gear 26 via the coupling ring 50. The roller disk 90 defines a central opening 94 having a plurality of internal roller 96 circumferentially arranged around a perimeter of the opening 94. The rollers 96 may be integrally formed with the disk 90 or may be separate components that are attached to the disk 90. In some embodiments, the roller 96 are static components that are rotationally fixed with the disk 90, and in others, the rollers 96 are configured to rotate relative to the disk 90. A plurality of pins 98 are circumferentially arranged on a face of the disk 90. The pins 98 project from the face in an axial direction of the differential 20. The pins 98 may be integrally formed with the disk 90 or may be separate components that are attached to the disk 90. In some embodiments, the pins 98 are static components that are rotationally fixed with the disk 98, and in others, the pins 98 are configured to rotate relative to the disk 60. The number of pins 98 and the number of rollers 96 may be equal. The pins 98 may be attached to the roller disk 90 so that associated ones of the pins 98 and the rollers 96 have a common center point.

The output member 32 of the second cycloidal drive 24 is a carrier disk. The carrier disk 32 is supported for rotation within the coupling ring 50. The carrier disk 32 includes an outer surface 100 that is seated on the central race 58 of the coupling ring 50. A bearing may be disposed between the carrier disk 32 and the coupling ring 50. The carrier disk 32 defines a plurality of circumferentially arranged holes 102 arranged to receive the pins 98 of the roller disk 90. A diameter of the holes 102 is larger than a diameter of the pins 98 allowing for the eccentric, cycloidal motion of the roller disk 90. Eccentric bearings may be provided between the pins 98 and the holes 102.

A cycloidal cam 104, of the second drive 24, is supported for rotation within the central opening 94 of the roller disk 90. The cycloidal cam 104 includes a plurality of lobes 106 configured to engage with the internal rollers 96. The number of lobes 104 may be less than the number of rollers 96. In the illustrated embodiment, the cam 104 includes seven lobes and the roller disk 90 includes eight rollers 96 and eight pins 98.

A side plate 108 encloses the second drive 24 within the hub 42. The side plate 108 is received within the second recessed portion 46 of the hub 42 and is rotationally fixed to the ring gear 26. The side plate 108 may be attached to the hub 42 by welding, fasteners, or the like. The cam 104 is rotationally fixed to an inner face 110 of the side plate 108. The cam 104 may be attached to the side plate 108 by welding, fasteners, pins, or the like, or may be integrally formed with the side plate 108. The cam 104 is attached to the side plate 108 for on-axis rotation. Both the cam 104 and the side plate 108 may define a hole 112 allowing the other half shaft to extend into the differential 20 to connect with the carrier disk 32.

The second cycloidal drive 24 is configured to have relative rotation between its various components. For example, if the cam 104 is held stationary and the carrier disk 32 is rotated counterclockwise, then the roller disk 90 will have a counterclockwise eccentric, cycloidal motion. Since the roller disk 90 is connected with the coupling ring 50, the coupling ring will rotate counterclockwise within the ring gear 26 when the carrier disk 32 is rotated counterclockwise.

In the illustrated embodiment, the first cycloidal drive 22 is an eighth-order drive (cam 30 has eight lobes) and the second cycloidal drive 24 is a seventh-order drive (cam 104 has seven lobes). By having one of the drives of m order and the other of m+1 order, the speed ratios between the output members are equal. While illustrated as having an eighth-order drive and a seventh-order drive, the differential 20 may have any combination of an m order drive and an m+1 order drive, where m is greater than or equal to 2.

The differential 20 is designed to have a 1:−1 speed ratio between the output members, i.e., the output member 30 rotates clockwise if the output member 32 rotates counterclockwise. Various internal components of the cycloidal drives 22, 24, e.g., the roller disks and the coupling ring, are designed to rotate within the ring gear 26 when the output members 30, 32 rotate in opposite directions or at different speeds.

The differential 20 is also designed to lock the first and second drives 22, 24 relative to each other when the output members 30, 32 rotate in the same direction at a same speed, e.g., straight-line driving. During straight-line driving, the various components of the first and second drives 22, 24 are not rotating relative to the ring gear 26 so that the output members 30 and 32 rotate at the same speed and in the same direction as the ring gear 26.

Figure 4:
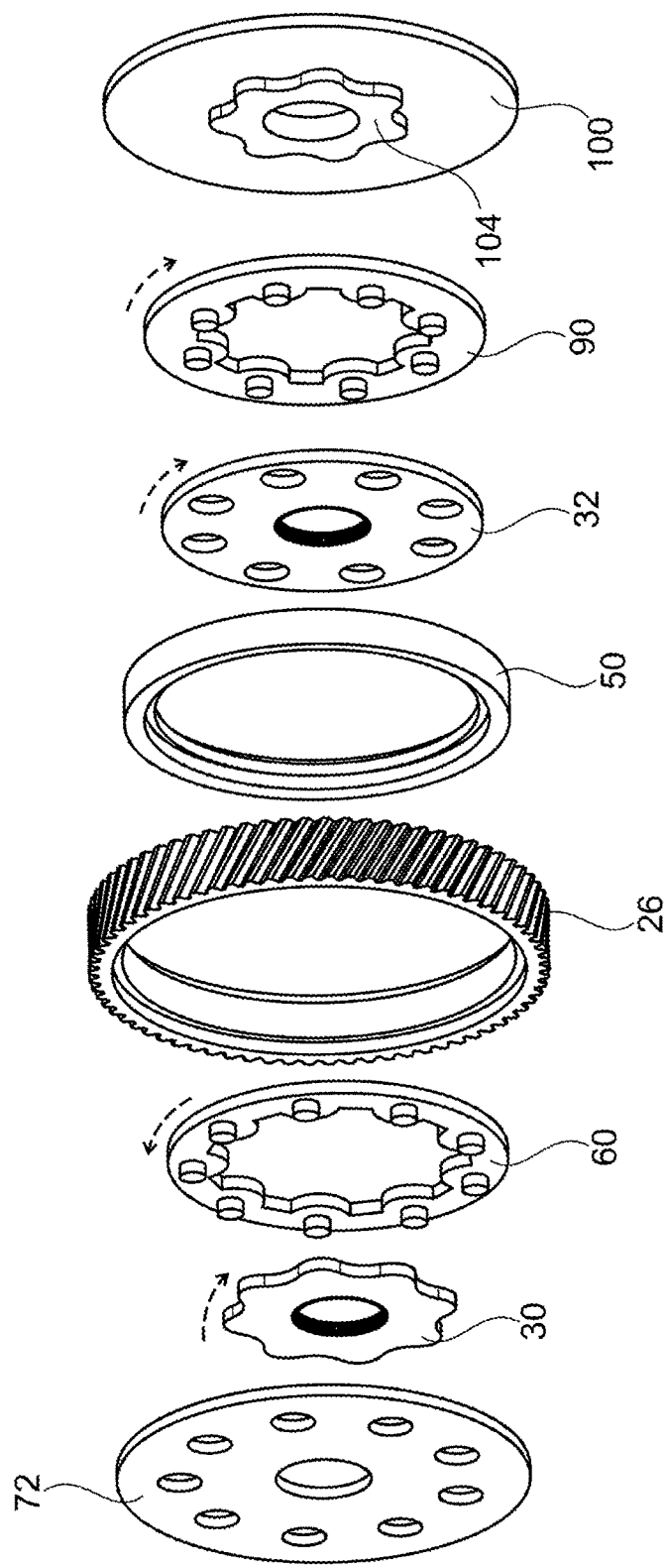
FIG. 4 is an exploded perspective view of the cycloidal differential during straight-line driving.

In FIG. 4 the dashed arrows indicate would-be relative rotation between the illustrated parts—not actual relative rotation. (As will be explained below, the entire assembly is locked relative to each other and rotates in unison with the ring gear.) The differential 20 is shown with the output members 30 and 32 rotating at the same speed and in the clockwise direction such as during straight-line driving of the vehicle. If first output member 30 is urged clockwise, the roller disk 60 is urged to have eccentric, cycloidal motion in the counterclockwise direction. If second output member 32 is also urged clockwise, the roller disk 90 is urged to have eccentric, cycloidal motion in the clockwise direction. Thus, the first and second roller disk 60, 90 are urged in opposite directions. The coupling ring 50 prevents this causing the differential 20 to lock up, i.e., none of the individual components of the differential rotate relative to each other. Instead, all of the individual components rotate with the ring gear 26. Thus, when the vehicle is driving in a straight line, the ring gear 26 and the output members 30, 32 rotate at the same speed and in the same direction.

Figure 5:
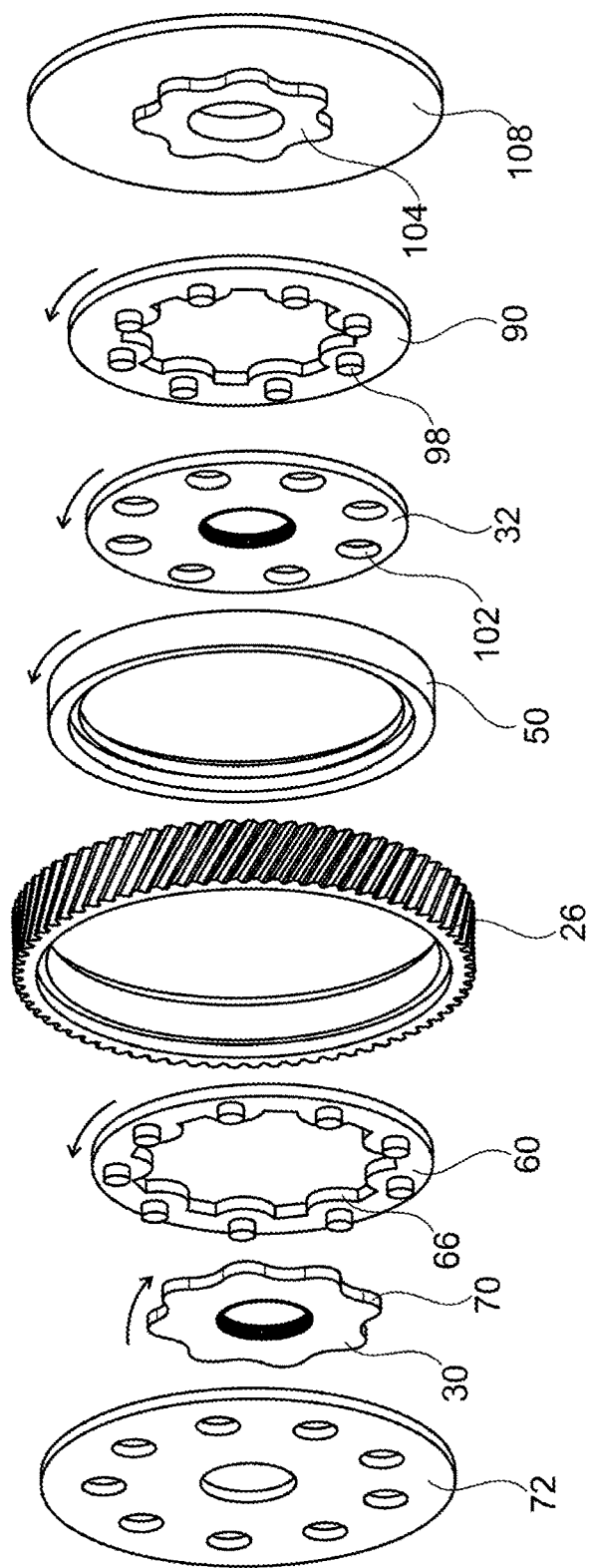
FIG. 5 is an exploded perspective view of the cycloidal differential during cornering.

In FIG. 5 the solid arrows indicate actual relative rotation between the illustrated parts—not overall rotation. (The entire illustrated assembly rotates clockwise with the ring gear during driving of the vehicle.) The differential 20 is shown during cornering of the vehicle with the output members 30 and 32 rotating at the different speeds. The output member 32 is connected to the inner wheel, and the output member 30 is connected to the outer wheel.

During a corner, the output member 30 is rotating faster than the ring gear 26 and is inputting rotation into the differential 20. The clockwise rotation of the output member 30, i.e., increased angular speed, causes counterclockwise eccentric, cycloidal motion of the roller disk 60 due to rolling engagement between the rollers 66 and the lobes 70. The counterclockwise eccentric, cycloidal motion of the roller disk 60 causes the coupling ring 50 rotate counterclockwise within the hub 42. The coupling ring 52 causes the roller disk 90 to have a counterclockwise eccentric, cycloidal motion. The pins 98 engage with the holes 102 to transfer motion from the roller disk 90 to the carrier disk 32 causing the output member 32 to rotate in the counterclockwise direction. The counterclockwise direction of the output member 32 is being used as a relative term meaning that the output member 32 is rotating slower than the ring gear 26 and the output member 30. In reality, both of the output members 30 and 32 rotate in the same direction, which is also the same direction of rotation as the ring gear, but at different speeds.

This disclosure is not limited to the illustrated embodiments. The cycloidal drives of the differential can be rearranged to form other types of cycloidal differentials. Applicant's co-pending applications—U.S. patent application Ser. No. 15/864,442 and U.S. patent application Ser. No. 15/864,492, filed on the same day as this disclosure, which are incorporated in their entirety by reference herein—disclose other types of cycloidal differentials.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A cycloidal differential comprising:
a driven body;
a coupling ring supported for rotation within the driven body and defining a first eccentric race and a second eccentric race on opposing sides of the coupling ring;
a first cycloidal drive including a first roller disk received in the first eccentric race and a first output member operably coupled to the first roller disk and configured to couple with a half shaft; and
a second cycloidal drive including a second roller disk received in the second eccentric race and a second output member operably coupled to the second roller disk and configured to couple with another half shaft.

2. The cycloidal differential of claim 1, wherein the first roller disk defines a central opening having internal rollers circumferentially arranged around a perimeter of the opening.

3. The cycloidal differential of claim 2, wherein the second roller disk defines a central opening having internal rollers circumferentially arranged around a perimeter of the opening, wherein the second roller disk includes less internal rollers than the first roller disk.

4. The cycloidal differential of claim 2, wherein the first roller disk includes pins circumferentially arranged on a face of the first roller disk.

5. The cycloidal differential of claim 4, wherein each of the pins is concentric with a corresponding one of the rollers.

6. The cycloidal differential of claim 2, wherein the first output member is a cycloidal cam disposed within the central opening of the first roller disk and defining lobes configured to engage with the rollers to create an eccentric, cycloidal motion of the first roller disk, and wherein the number of lobes is less than the number of rollers.

7. The cycloidal differential of claim 1, wherein the first output member and the first roller disk are configured to drive each other in opposite directions.

8. The cycloidal differential of claim 7, wherein the second output member and the second roller disk are configured to drive each other in a same direction.

9. The cycloidal differential of claim 1, wherein the first eccentric race surface and the second eccentric race surface have different center points.

10. The cycloidal differential of claim 1, wherein the driven body is a gear.

11. A cycloidal differential comprising:
a first cycloidal drive including:
a first roller disk having internal rollers and axially extending pins, and
a first cycloidal cam defining lobes configured to engage with the rollers and configured to couple with a half shaft; and
a second cycloidal drive including:
a second roller disk having internal rollers and axially extending pins, and
a second carrier disk defining holes that receive the pins of the second roller disk and configured to couple with another half shaft.

12. The cycloidal differential of claim 11, wherein the cycloidal drives are configured such that the first and second roller disks are urged to move in opposite directions responsive to the first cycloidal cam and the second carrier disk rotating in unison.

13. The cycloidal differential of claim 11, wherein the cycloidal drives are configured such that the first and second roller disks have an eccentric, cycloidal motion in a same direction responsive to the first cycloidal cam and the second carrier disk rotating in opposite directions relative to each other.

14. The cycloidal differential of claim 11 further comprising a coupling ring including a first eccentric race and a second eccentric race on opposing sides of the coupling ring, wherein the first roller disk is seated on the first race, and the second roller disk is seated on the second race.

15. The cycloidal differential of claim 14 further comprising a driven body connected to the first and second cycloidal drives, wherein the coupling ring is supported for rotation within the driven body.

16. The cycloidal differential of claim 11, wherein the first cycloidal drive further includes a side plate defining holes and the first roller disk has pins that are received in the holes.

17. A cycloidal differential comprising:
a driven body;
a coupling ring supported for rotation within the driven body and including a first eccentric race and a second eccentric race on opposing sides of the coupling ring;
a first cycloidal drive including:
a first roller disk received in the first eccentric race and defining a central opening having internal rollers circumferentially arranged around a perimeter of the opening, the first roller disk further having pins circumferentially arranged on a face of the first roller disk,
a first cycloidal cam supported within the central opening and defining lobes configured to engage with the rollers, wherein the first cycloidal cam is configured to couple with a half shaft, and
a first side plate attached to a first side of the driven body and defining circumferentially arranged holes that receive the pins therein; and
a second cycloidal drive including:
a second roller disk received in the second eccentric race and defining a central opening having internal rollers circumferentially arranged around a perimeter of the opening, the second roller disk further having pins circumferentially arranged on a face of the second roller disk,
a carrier disk supported for rotation within the coupling ring between the first and second roller disks and defining holes that are circumferentially arranged and that receive the pins of the second roller disk therein, wherein the carrier disk is configured to couple with another half shaft,
a second endplate attached to a second side of the driven body, and
a second cycloidal cam rotationally fixed to the second endplate and supported for rotation with the central opening of the second roller disk, the second cycloidal cam defining lobes configured to engage with the rollers of the second roller disk.

18. The cycloidal differential of claim 17, wherein the number of lobes on the first cam is equal to the number of pins on the second roller disk.

19. The cycloidal differential of claim 17, wherein the first cam has one more lobe than the second cam.

20. The cycloidal differential of claim 17, wherein the first eccentric race and the second eccentric race have different center points.

\* \* \* \* \*